Jan. 13, 1948. W. A. FELKER 2,434,314
ABRASIVE ARTICLE AND METHOD OF MANUFACTURE
Filed Oct. 24, 1944 4 Sheets—Sheet 1

Inventor
Walton A. Felker
Batchelor & Lewlebury
Att'y.

Jan. 13, 1948. W. A. FELKER 2,434,314
ABRASIVE ARTICLE AND METHOD OF MANUFACTURE
Filed Oct. 24, 1944 4 Sheets-Sheet 2

Inventor
Walton A. Felker
Barkelew & Castleberry
Att'y

Jan. 13, 1948.  W. A. FELKER  2,434,314
ABRASIVE ARTICLE AND METHOD OF MANUFACTURE
Filed Oct. 24, 1944  4 Sheets-Sheet 3

Inventor
Walton A. Felker
Barkelew & Seawlebury
Atty.

Jan. 13, 1948. W. A. FELKER 2,434,314
ABRASIVE ARTICLE AND METHOD OF MANUFACTURE
Filed Oct. 24, 1944 4 Sheets-Sheet 4

Inventor
Walton A. Felker

Patented Jan. 13, 1948

2,434,314

UNITED STATES PATENT OFFICE 2,434,314

ABRASIVE ARTICLE AND METHOD OF MANUFACTURE

Walton A. Felker, Torrance, Calif.

Application October 24, 1944, Serial No. 560,086

6 Claims. (Cl. 51—293)

1

This application is a continuation in part of my copending application Ser. No. 463,488, filed October 27, 1942 now abandoned.

This invention has reference generally to abrasive articles, such as wheels, cutters, blades, etc., of the type in which abrasives are set in recesses in a body which is usually, but not necessarily, of metal. A typical form of abrasive cutter is that of a thin disk-like saw, in which the body is formed of a thin disk of metal with peripheral notches, and the cutting abrasive is set in those notches. But the invention is generally applicable to abrasive articles of other forms, and for uses other than sawing, as will be explained. For instance, the invention may be applied to cutters in the form of straight blades for reciprocating sawing, bandsaw blades, peripheral wheels, cup wheels, core drills, or cylinders, disks or slabs for various kinds of surface grinding or lapping.

The invention also has particularly reference to the use of diamond as the abrasive, but is generally applicable to any other suitable abrasive, such for instance as silicon carbide of aluminum oxide. Without limitation thereto, except as expressly hereinafter stated, the invention will first be described in a typical and illustrative form as applied to a saw of thin disk form utilizing diamond as the abrasive. Such saws are largely used for cutting materials such as glass or quartz.

It has been common in the past to make disk saws by setting the grains of abrasive in peripheral notches in the saw body, securing the abrasive grains by pressing the body and grains in such a manner as to more or less embed the grains. It has been found that such saws have been satisfactory in use to a certain extent, but they have not been sufficiently free-cutting in their action, and the abrasive grains tend to being easily and soon torn out. The general object of the present invention is to provide structure, and a method of formation, which produces a cutter with free-cutting qualities, and with the ability to hold the abrasive grains for a longer life. I have accomplished this objective, and solved the problems presented by the former cutters, by providing a structure and a method of formation in which the abrasive grains, such as diamond, are set in the body notches under heat and pressure in such manner that the abrasive is securely bound in the body notches and incorporated into the body. The abrasive grain may be carried in a matrix of any suitable type; and if the matrix be of metal it is sintered and compressed into a

2 cohesive body at the same time that it and the abrasive grain are set and incorporated in the body. How this is done, and the features and characteristics of the resultant cutter, will all be best understood from the following detailed description of typical and illustrative procedures which are used for production of a typical and illustrative disk saw and other abrasive articles. In connection with this description I refer to the accompanying drawings in which Fig. 1 is an enlarged fragmentary side elevation of a peripheral portion of a thin metal disk as it appears with its initial notching;

In the drawings numeral 20 designates a thin body disk, which is chosen of suitable diameter and thickness, with reference to the purposes for which the finished cutter is intended. The chosen dimensions may vary widely. Typical useful dimensions for a thin abrasive cutter or saw, given merely as an illustration, may be somewhat as follows: Diameter say 8", thickness say 0.035". A cutter of such dimensions has a thin cutting edge face. If the thickness of the disk be increased, to, say, ¼ inch or more, the edge face becomes, in practice, a peripheral grinding face, a wheel of that thickness or more being usually used for surface grinding rather than for cutting slots. My methods are applicable to any such disk, regardless of its thickness and even though its relative thickness and diameter are such that the disk would ordinarily be called a cylinder. The following parts of the description, relating to a cutter of disk form should be read with those facts in view.

Suitable material for such a disk may be cold rolled, or soft, steel; or may be rather hard copper. Or a material such as carbon steel may be used, and hardened after the heat treatment which is hereinafter described.

In the procedure of making the disk saw or other disk wheel the first operation is the formation of notches extending across the peripheral cutting or grinding face, such as the notches indicated at 21. These notches may be initially of V-formation with the axis or center plane of the V at a substantial angle to the radius passing through the V-formation; that is, at a substantial angle to a line (the radius) which is normal to the peripheral direction, or length, of the cutting face at the notch mouth. Typical, but merely illustrative dimensions of the V-formation are as follows. The radial depth of the formation is about 0.08", the width of the notch mouth at the peripheral edge of the disk is about 0.03" as originally formed, and the wall 22 of the V-shaped notch, or the axis of the notch, makes an angle of about 30° with the disk radius which extends through the V. The comparative depth and width of the notch is preferably such that the subsequently described operations will close the notch walls down toward each other to be substantially parallel. In any case, the notch bottom is not sharp; it preferably has, in the illustration given, a width of, say, 0.013". And for some purposes I prefer to initially form the notches with walls nearly parallel and with a width of, say, about 0.15" from mouth to bottom. In any case, the angle of the notch axis or center plane, above referred to, is sufficient that both notch walls slant in the same direction and that the overhanging wall 23 overhangs the other wall 22.

These notches are preferably made by displacing the material of the disk, so that the material is swaged outwardly in all directions to form protruding ridges around the notches both at the side faces of the disk and at its peripheral face. In practice, the notches are formed cold with a cutting chisel which is forced into the metal along a line of movement parallel to one of the notch walls, 22 or 23, say notch wall 23. The notching chisel for a V-notch has all its edge bevel on one face and moves parallel to its plane face. Preferably it has a rather blunt edge, so that the bottoms of the V-shaped notches instead of being sharp are of some substantial width, say about 0.01" or more. This is for the purpose of allowing the abrasive grains to be taken in the notches to their bottoms.

Figure 1:
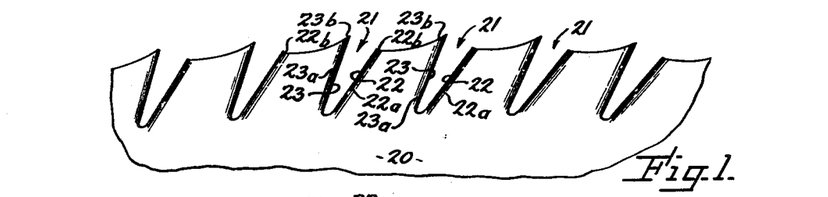
Figure 2:
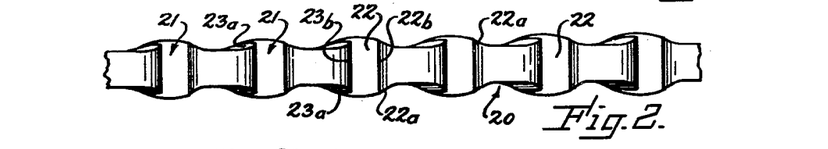
Fig. 2 is an edge view of the same.

The result of this notch forming operation is the formation of such a series of notches as shown in Figs. 1 and 2, with either angularly disposed or substantially parallel wall faces 22 and 23 and with raised ridges 22a and 23a at the side faces of the disk along the lateral edges of walls 22 and 23, and raised ridges 22b and 23b at the periphery of the disk along the mouth edges of notch faces 22 and 23. The method of notch formation, by such a swaging operation along a line at an acute angle to the radius, results in the raised ridge 23b being substantially larger than that at 22b, and in the raised ridges at 23a being substantially larger than those at 22a. In fact, in some cases, the ridge at 22b may be substantially non-existent. The metal which is moved, to form the notch, is moved mainly in a direction toward the rear overhanging notch wall 23, so that the ridges around that wall are predominant. (I use the term rear, as applied to notch wall 23, with reference to the direction of rotation of the cutter in use, indicated by the arrow in Fig. 9). In the typical illustrative instance the raised lateral ridges at the side faces of the disk are of sufficient dimensions to give an overall disk thickness at the ridges of say approximately 0.060". In any case this overall thickness through the raised lateral ridges is preferably sufficient to allow of some material reduction in overall thickness in subsequent operations, and still to leave the overall thickness of the peripheral or rim portions of the finished disk substantially greater than the thickness of the disk body, so as to provide the lateral overhang which is desirable for free running and free cutting.

The abrasive filling for the notches may be of any suitable abrasive grain with or without a containing matrix or bond; and if a matrix or bond is used it may be of any suitable material and character. For instance the bonding matrix may be of a suitable resin, synthetic or natural, or may, preferably be of metal. I will first describe operations and structure which utilize a metal matrix and then describe how the abrasive grain may be set in other bonding matrices or without a matrix.

A metal matrix which is to carry diamond granules may utilize various metals, but preferably a mixture of finely powdered metals which are capable of mutually entering into an alloy solution. Typically and illustratively, I have employed a matrix mixture made up of 75 percent copper and 25 percent tin. In the typical case the matrix metals are preferably chosen to fuse or alloy at a temperature lower than fusion of the disk. Preferred powder mixtures for a steel bodied cutter are Cu 87.5%, Sn 12.5%; and for a copper bodied cutter are Cu 70%, Sn 30%. The metals for making up the matrix mixture are ground as finely as is practicable, usually to flour fineness; and the metal mixture, of the typical proportions given, is then intermixed with the diamond granules in proportions which may vary widely but typically are about 300 mg. of the metal mixture to one carat of diamond (about three to two by weight). The proportionate amount of the metal matrix may be less than the proportion given. In some cases it may be desirable to make the mixture as rich in diamond as is practicable, and to keep the matrix proportion down to the amount which is just necessary for securely setting and holding the diamond particles. The diamond particles may be of any suitable size or sizes. In practice, for a cutter of such dimensions as I have given and for cutting material such as glass and quartz, I find that a mixture of diamond particles running from sizes of about 40 mesh to fine powder is effective.

A small amount of temporary adhesive or cement is admixed with the diamond-matrix mixture. In general, any adhesive or cement which hardens in a short period, preferably by drying, and which is driven off in the subsequent heat treatment, may be used. I find a casein glue suitable, used in a proportionate amount just substantially sufficient to adhere the particles of the mixture.

Figure 3:
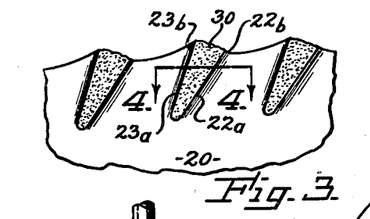
Fig. 3 is a view similar to Fig. 1 showing the notches as they appear when initially filled with the diamond-carrying matrix.
Figure 4:
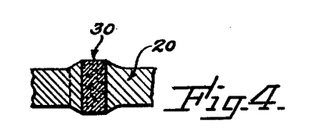
Fig. 4 is a section on line 4—4 of Fig. 3.

The adhered mixture is then filled into the disk notches, so as to fill them completely and substantially flush, as shown at 30 in Figs. 3 and 4. This operation may be performed by hand or by any suitable instrumentality. Although it is desirable to fill the notches fully and without any substantial voids, it is not necessary to apply any substantial pressure during the operation. After the notches are filled, the adhered mixture is allowed to set before the ensuing heating and pressing operation is performed.

The general purpose of the ensuing operation is to apply both heat and pressure to the peripheral portions of the notched disk and to the diamond and matrix mixture, leading to several simultaneous results. Under the application of heat the matrix mixture is set by being sintered and at least superficially alloyed into an integral metal mass which effectively sets the diamond particles. Also, the disk metal is heated and softened and the tin of the matrix is sinter-soldered to it. And, the simultaneous application of pressure has both the effect of swaging the notch edges over and around the metal matrix, of forcing and compressing the metal matrix and the diamonds into the notches and into pressural engagement with the walls of the notches, and also the effect of pressing the rear overhanging notch wall 23 down onto the filling. In this operation the hard diamond particles tend to press into the notch walls and thus to secure the diamond and matrix body more securely in the notches.

Figure 5:
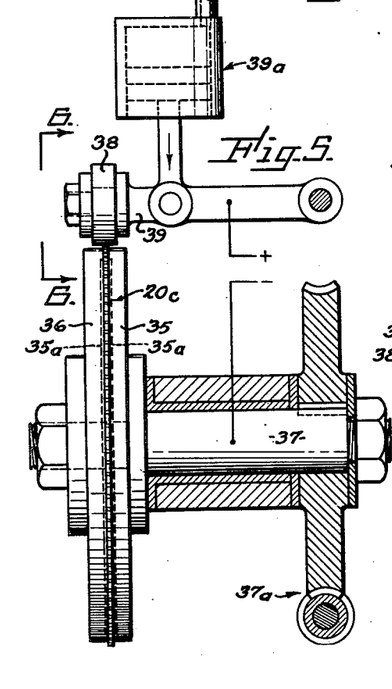
Fig. 5 is a diagrammatic view illustrating one form of an initial operation wherein heat and pressure are applied to the disk periphery and to the diamond-carrying matrix.
Figures 5A, 6:
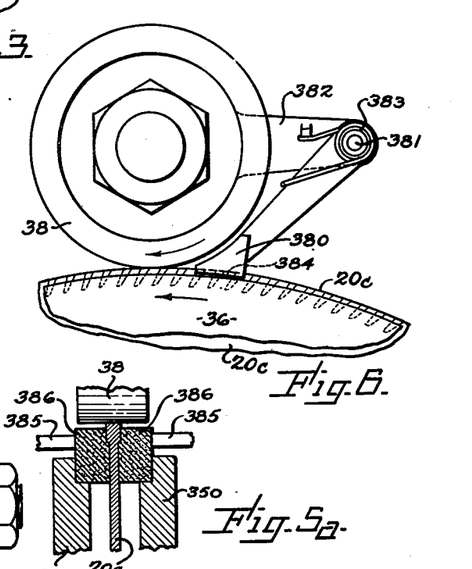
Fig. 5a is a fragmentary diagrammatic section, similar in aspect to Fig. 5, but illustrating a modified arrangement for heating the disk.
Fig. 6 is an enlarged fragmentary diagrammatic elevation in the aspect illustrated by line 6—6 of Fig. 5, and showing a modification.

One manner of carrying out this heat and pressure operation is illustrated in Figs. 5 and 6, although other arrangements may be used as later described. The prepared disk, here indicated generally by the numeral 20c, is clamped tightly between two circular plates 35 and 36, the latter being preferably of diameters such as to clamp disk 20c quite close to its periphery. In the illustrative case the disk will be laterally clamped within about $\frac{1}{32}$" or less of its peripheral edge. As shown in Fig. 6 the peripheral portions of the clamping plates close the sides of the inner or major portions of the disk notches to prevent outward flow of the diamond and matrix mixture from the notches. The tightly clamped disk is preferably carried on a shaft 37 rotated in any suitable manner, as by worm gearing 37a. Any such suitable arrangement facilitates rotation of the disk while it is subjected to lateral pressure (the clamping pressure) at its peripheral edge portions. The clamping disks are preferably recessed as at 35a so that the clamping pressure is applied at the periphery.

As will be made clear later on, it is not functionally necessary to the operations that the whole of the notched and filled portion of the disk be clamped to laterally confine all of the notches simultaneously. The forming pressures are applied locally and progressively to the disk, and it is only necessary to laterally confine the local portion to which the pressures are being applied. Later on I explain operations in which the lateral confinement is local and progressive.

Radial pressure, either percussive as by hammer, or continuous, may be applied to the disk in various manners, for instance by a pressure roller or a shoe or the like. In Fig. 5 I show a pressure roller; in Fig. 6 both a roller and a shoe. The freely revoluble pressure roller 38 is carried on an arbor 39 which is movable in the direction indicated by the arrow in Fig. 5 to apply local pressure to the periphery of the disk 20c. Any suitable means may be used to apply the pressure, such as the hydraulic ram 39a which is diagrammatically illustrated. A heating current is applied in a circuit running through the disk and the pressure roller, as indicated diagrammatically in Fig. 5. In this arrangement the pressure roller is one electrode and the saw disk the other.

In Fig. 6 a pressure and contact shoe 380 is also shown. Substantial radial pressure may be applied through such a shoe, and it may be used either alone, without the roller 38, or in conjuntion with it. Although the shoe may be mounted in any suitable manner it is here illustratively shown as pivoted at 381 on a bracket 382 which extends out from arbor 39, and pressed against the disk by a spring 383. Its pressure surface may be grooved as at 384 to overhang the sides of the disk periphery.

In this particular illustration, the radial pressure is applied to the disk mainly through roller 38 while the heating current is applied through both the roller and shoe, so that heat is applied to the disk ahead of the roller as well as directly under it.

The operation is performed by rotating the clamped disk slowly, in the direction indicated by the arrow in Fig. 6, and simultaneously bringing pressure roller 38, and/or shoe 380, down into pressure contact with the disk periphery. For a steel disk of approximately the dimensions given, a total pressure of about 100 to 200 lbs. applied to the limited area of contact has been found effective. For a copper disk of the same size the pressure is somewhat lower. And it has been found effective to regulate the heating current so that the disk is locally peripherally heated to temperatures ranging from about 800 to 2000° F. A suitable temperature for a copper disk has been found to be about 450° C.; for a steel blade, about 800° C. The transiently applied temperature can effectively be as high as can be safely applied without fusing the disk. Under these conditions I have found that effective results are obtained by rotating the disk at a peripheral speed of about ½ inch per second. The highly heated area extends along the disk edge a distance of about ⅓ to ½ inch; so that the time period of heat treatment is about one sec., more or less.

Under the influence of the applied temperature, the metal matrix is sintered into an integrated, diamond setting mass, and the metal matrix is sinter-soldered to the body. The pressure which is radially applied to the softened metals has the result of pressing the softened peripheral edge of the disk inwardly and therefore of pressing the ridges 22b and 23b and at least the outer part of overhanging wall 23, inwardly and downwardly over the metal and diamond mass. How much of the overhanging wall is pressed over, and how far that wall is pressed over to close down the notch, depends upon the pressure utilized. The disk during this operation is being rotated in the relative direction indicated in Fig. 6—backwards; so that both the pressure and the dragging tendency is to close the overhanging notch wall 23 down on the mass in the notch to narrow the notch and to make wall 23 overhang more (see Fig. 9). Even if the notch has been initially formed with a definite V-angle, wall 23 is pressed down to substantial parallelism with wall 22. At the same time the radially applied pressure presses the metal and diamond mass radially inwardly in the notch and consequently presses against walls 22 and 23 of the notches, and embeds the superficial diamonds into those walls. The clamping pressure of the clamping plates prevents lateral expansion of the diamond and matrix mass during the operation and in fact may, to some extent tend to compress the mass laterally and also to compress the raised ridges 22a and 23a over the edges of the mass. The radial pressure, which presses the disk periphery inwardly almost to the peripheries of clamping plates 36 so that the abrasive cannot squeeze out, also swages out peripheral side fins or ridges 43 which are afterwards pressed in by the cold rolling operations described later.

Before describing the later operations I wish to mention briefly some other arrangements which may be used for the heating and pressing operation, and also the operations in which other matrices, or none, may be used.

In any case the heating may be had by flame, as by a gas flame directed onto the disk edge at the pressure point or in front of it. Electrical heating is preferred, and it may be varied in application. In the form which has been shown, the pressure roller or shoe and the disk are the electrodes and the disk is the main resistance element which develops the heat. Separate resistors may however be provided, as indicated diagrammatically in Fig. 5a. Here, instead of applying the heating current through roller 38, it is applied through contacts 385 to two annular resistor elements 386, of graphite or other suitable material, carried by plates 350 and 360 and clamping the disk edge between them. The heat is here developed mainly in the resistor rings and transferred to the disk by conduction.

Although the heat may be in some instances applied to the disk somewhat ahead of the point of pressure application, the result in every instance is that the portion of the disk which is being subjected to forming pressure is heated simultaneously with the localized application of pressure.

The heating and pressing operations are substantially the same, if other matrices, or none, are used. In using other bonding matrices the temperature necessary for sintering, curing or setting may not be as high as those previously mentioned for sintering the specifically named metals, and the applied temperatures may accordingly be modified, as also the time period of heating. It may be desirable in any case that the temperature be high enough to effectively soften the disk; but in cases where the matrix setting temperatures are relatively low, the applied pressure, or time period, or both may be increased.

Figure 9:
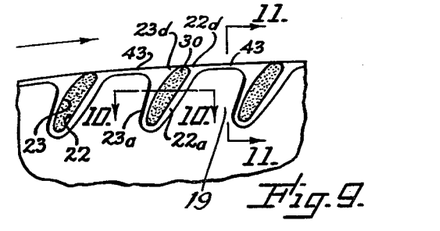
Fig. 9 is a fragmentary enlarged elevation, on the same scale as that of Figs. 1 to 4, illustrating the typical formation of the finished cutter of the thin disk type.

It is desirable in some instances to set diamonds or other abrasive in the notches without a matrix or bond. In that circumstance the abrasive grain is merely admixed with suitable temporary adhesive, say casein glue, and the adhered abrasive placed in the notches. The pressing and heating operations are then carried out to set and clamp the abrasive grains in the contracted notches. The abrasive is distributed throughout the depth of the notches and bites into the notch walls to be securely held. The notches may be closed down still more narrowly than is shown in Fig. 9, closed down in fact to fine slits which clamp the abrasive grain at each side. I have found that abrasive grain may be very securely set in this manner without a binder or matrix.

Figure 7:
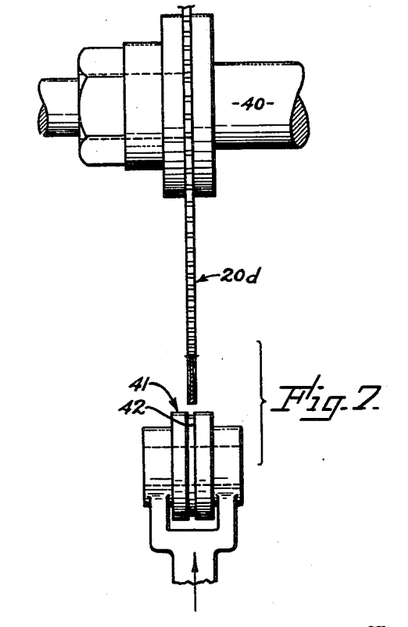
Fig. 7 is a diagrammatic view illustrating one of the finishing operations in which pressure is applied radially to the disk cutter.
Figure 11:
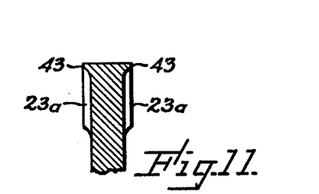
Fig. 11 is a section on line 11—11 of Fig. 9.

In the particular method procedures which I am now explaining the final operations are for trueing up the disk and for pressing the raised edge ridges of the notches down to desired dimensions and pressing them around the edges of the metal and diamond mass. It is usually found necessary to give the disk body a general trueing up under pressure applied to the body, because the previous heating and pressure operation will have usually caused some warp. That particular trueing up operation need not here be entered into as it is immaterial to the invention. After the disk body has been generally trued up, the subsequent and final operations are those which are illustrated in Figs. 7 and 8. The operations of those figures may be carried out in either relative sequence. In the operation of Fig. 7, the disk, which is here indicated by the numeral 20d, is mounted on a suitable arbor 40 and a tool carrying a revoluble pressure roller 41, plain edged or with a shallow groove 42, is run up against the periphery of the disk for the purpose of accurately trueing up its edge. This trueing up operation, as well as the preceding heat and pressure operation, results in swaging the raised ridges 22b and 23b over the inserted mass 30, as indicated at 22d and 23d in Fig. 9. Incidentally, both of these radial pressure operations also tend to raise peripheral side ridges at the side edges of the disk, such as indicated at 43 in Figs. 9 and 11. The ridge at 43 is only incidental and of no functional effect, wearing off when the cutter is used and leaving only the functional spaced embossments (ribs 22a and 23a) which surround the lateral ends of the notches and fillings and provide the increased cutting width of the abrasive filling which is necessary for clearance.

Figure 8:
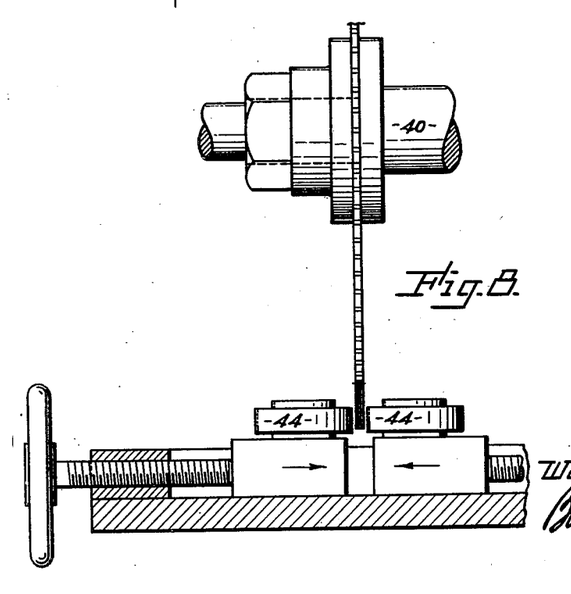
Fig. 8 is another diagrammatic view illustrating a finishing operation in which pressure is applied laterally or axially to the disk cutter.
Figure 10:
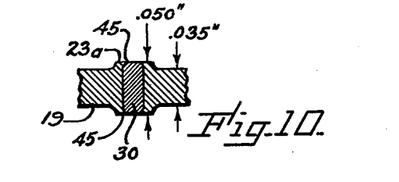
Fig. 10 is a section on line 10—10 of Fig. 9.

The peripheral notched portions of the disk are finally subjected to lateral pressure to roll and swage down the raised ridges 22a and 23a and side ridges 43 to the final overall thickness dimension which is desired. This is done by applying pressure with two opposing rollers 44, as indicated in Fig. 8. The peripheral notched portions of the disk, including the inserted masses 30, are thus pressed down to such a formation as is indicated in Fig. 10, to the final desired overall thickness. In this operation the ridges 22a and 23a are more or less swaged over the edges of the inserted mass, in the manner which is indicated at 45 in Fig. 10; and the inserted mass is also compressed laterally in the notches.

On each side surface of the disk the ends of the notches are surrounded by notch-outlining embossments, each such embossment being formed by the ridge 22a and ridge 23a associated with that end of the notch. These several embossments are definitely spaced apart peripherally by relatively recessed surfaces 19 shown in Figure 9 which are outward continuations of the disk side surfaces between adjacent embossments. The outer faces of the embossments 22a and 23a lie in planes outwardly of the disk side surfaces, and the ends of inserts 30 also lie in these same planes. The several embossments, with their respective inserts, thus present side surfaces of limited peripheral extent, alternating with the intervening recesses. This formation provides for clearance of the disk body with a minimum of metallic surfaces to be worn down as the cutter wears in thickness. With a metallic insert, each individual embossment-outlined area wears down evenly.

The two last operations as here described are carried out at ordinary temperatures, so that both the metal of the disk and the metal of the diamond containing matrix are finally compressed, both radially and laterally, in a cold state. The pressures employed in these final operations are not great; in practice they are only such pressures as are necessary to bring the periphery of the cutter to accurate circular trueness and smoothness and to bring the overall peripheral thickness down to approximately that which is desired. In the typical illustrative instance which I have given the finished peripheral overall thickness will be typically about 0.050". However, under the pressures which are used for these operations, the metals of both the disk and the inserted mass are compressed both radially and laterally in cold condition; with the result that the inserted mass is further compacted and is pressed into a close pressural engagement with the walls of the notches, and that pressural engagement is held permanently by the cold metals; and also with the result that the metal of the disk is pressed cold against and about the inserted mass, and that cold metal likewise permanently holds to close pressural engagement.

In cutting operation the cutter is run in the direction indicated by the arrow in Fig. 9; that is, in the direction in which the mouths of the notches face, so that the friction and drag tend to force the inserted abrasive mass against the rear overhanging notch wall 23 and under the overhanging ridges 45 and 23d. In all the forming operations the disk is rotated in the opposite direction, so that the pressure rollers, insofar as they tend to move the metal of the disk ridges in a peripheral direction, tend to move the metal so as to accentuate the overhang of wall 23 and of the ridges which are associated with it.

Figure 12:
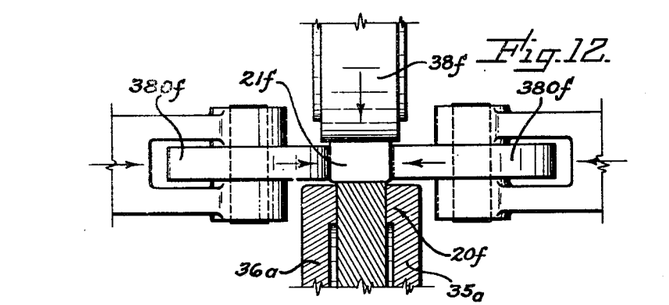
Fig. 12 is a diagrammatic view, similar in general aspect to Fig. 5, illustrating a modified form of heating and pressing operations applied to a disk.
Figure 13:
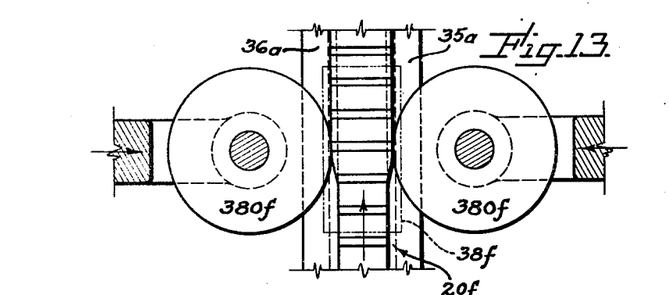
Fig. 13 is a diagrammatic plan section taken as indicated by line 13—13 on Fig. 12.
Figure 14:
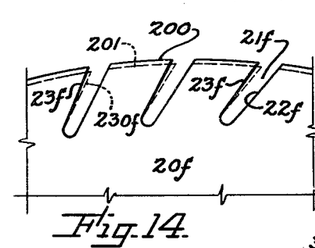
Fig. 14 is a fragmentary side elevation of the peripheral portion of a disk showing modified notchings.

Figs. 12, 13 and 14 illustrate a somewhat modified method applied to a wheel either like that shown in the preceding figures or somewhat modified. Here again the wheel may be considered as having any desired thickness; being illustrated as a wheel which may be used for peripheral cutting, or grinding. (For sake of uniformity, I will designate as "cutting face" that face of any abrasive body which performs the operation of removing material, whether that operation is ordinarily referred to as one of cutting or one of grinding).

Figs. 12 and 13 indicate diagrammatically an apparatus in which clamping disks 35a, 36a, clamp the wheel 20f in the same general manner as before described, but here the clamping disks are of such diameters that the wheel disk is clamped immediately inside the bottoms of the notches 21f. A peripheral pressure wheel 38f, similar in action to that of Fig. 5, is shown; and two lateral pressure rolls 380f are also shown, adapted to bear against the lateral faces of the notched rim portion of the wheel, or adapted to exert rolling and swaging pressure against those lateral faces, in line with the pressure line of roll 38f. The notched peripheral portion of the wheel may be heated in any of the manners before described, either with the heat applied at the point at which the rolling pressures are applied, or somewhat ahead of that point. In all of the operations which are described throughout this specification it is only necessary that the heat be applied at such a point on the wheel or plate that the notched portion is heated to the requisite temperature at the point of pressure application or applications. Specifically, in Figs. 12 and 13, the heating current may be applied to pressure roller 38f as one electrode and to the wheel disk as the other; or it may be applied to the two lateral rolls 380f so that the notched portion of the wheel is evenly heated throughout its radial or depth dimension by the passage of current through it.

Assuming that the wheel 20f has been notched in the manner before described, with the result of raising peripheral and lateral ridges around the notches, then in the operations of Figs. 12 and 13, the filled notches are locally laterally confined and the lateral ridges are rolled down to the desired overall lateral dimension by the two rollers 380f, simultaneously with the peripheral rolling operation performed by roller 38f. The final results are the same as the results of the several successive pressure steps which have been described in connection with Figs. 1 to 11.

However, the form of the wheel or disk may be varied to have no initial peripheral and/or lateral ridges such as shown in Figs. 1 and 2. A fragmentary portion of a disk peripherally notched in that manner is illustrated in Fig. 14, where the notches 21f, shown in their initial form in full lines, have no raised ridges around their edges and have their walls 22f and 23f initially nearly parallel or substantially so. If such a disk, after being filled with the abrasive filling, be subjected either to the operations which have been described in connection with Figs. 1 to 11, or to the operations illustrated in Figs. 12 and 13, the immediate result of the rolling performed by roll 38f is to roll the peripheral cutting face 200 down to such a level as shown at 201 in dotted lines, and to press the overhanging wall 23f inwardly and downwardly to such a position as shown in dotted lines at 230f. The general result is to compress the filling in the notches and to compress the overhanging notch wall down on to the filling, incorporating the filling into the material of the disk or wheel in the same manners as before described.

In operating upon such a non-ridged disk with apparatus such as shown in Figs. 12 and 13, rollers 380f may be set at such spacing as to prevent the radial swaging pressure of roll 38f from increasing the peripheral thickness of the disk or wheel. In that case, rolls 380f would simply be set to a spacing equal to the original thickness of the disk. For wide faced peripheral grinding wheels it is not necessary and may not be desirable to have the finished peripheral thickness (the width of the cutting face) greater than the thickness of the body of the disk. The increased cutting edge width is desirable or even essential in a slot cutting wheel such as first described; and the thickening formation there described (localized thickening or embossing by the ridges around the lateral edges of the abrasive carrying slots) has an advantage over a general thickening of the whole peripheral portion, as there is thus less metal present at the thickened lateral faces.

On the other hand, if it is desired to form a peripheral cutting face portion of relatively increased thickness, rolls 380*f* may be set at a spacing somewhat as indicated in Figs. 12 and 13, somewhat greater than the initial or body thickness of the disk. Then, and particularly if the heating current is applied between rolls 380*f* so as to uniformly heat the peripheral portion throughout the depth dimension of the notches, the rolling swaging action of roll 38*f* has the action of increasing the thickness of the rim portion, to a thickness which is limited by the spacing of the rolls 380*f*. In actual operation, the rolling swaging action of roll 38*f* would be sufficient that, if not limited by rolls 380*f*, it would increase the rim thickness to a relatively greater dimension; and the limiting action of rolls 380*f* is in the nature of rolling down that excessive thickness. In doing that the rolls 380*f* will, to some extent at least, form overhangs at the side edges of the notch walls like those shown at 45 in Fig. 10; and likewise the peripheral roll 38*f* will to some extent form, at the peripheral edge of walls 230*f*, an overhang like that shown at 23*d* in Fig. 9. However, the main and primary action of the several pressure rolls here is to swage the disk or wheel down on its peripheral cutting face, to force the overhanging wall 23*f* over and against the filling, to compress the fillings in the notches, to confine the notches laterally while the pressure operations are applied, and to limit the final thickness of the notched portion of the body and to roll it down on its lateral faces.

Figure 15:
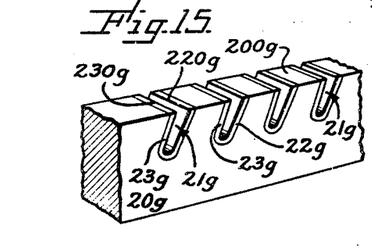
Fig. 15 is a fragmentary perspective illustrating the notched formation applied to an edge face of a straight blade such as a hack-saw blade or a band saw.
Figure 16:
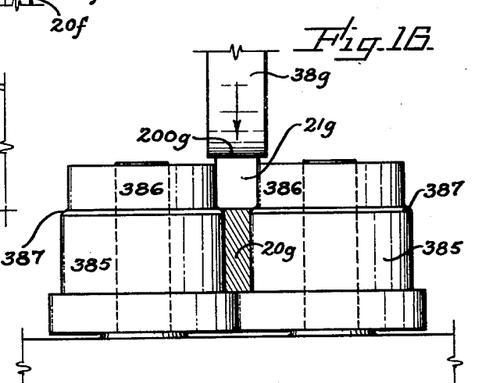
Fig. 16 is a diagrammatic view illustrating the application of the heating and pressing operations to such a blade.

The illustrations so far given have shown the application of my methods to the formation of an edge or peripheral cutting face on a disk. That peripheral cutting face may be regarded as an elongate cutting face into which the notches are sunk angularly and across which they extend. The same general methods may be applied to the elongate cutting or abrasive face of a straight elongate body, and Figs. 15 and 16 illustrate the formation applied to the elongate edge cutting face of such an article as the hacksaw blade or band saw blade. Fig. 15 shows in exaggerated enlargement a straight body 20*g* with notches 21*g* extending across its elongate cutting face 200*g*. The notches are here shown as being initially substantially parallel-walled and as having the lateral edge ridges 22*g* and 23*g*, and mouth edge ridges 230*g* and 220*g* similar to those shown in Figs. 1 and 2. The notches extend in depth at an acute angle to the length of cutting face 200*g*, just as they do with reference to the cutting faces of the disks previously explained. If the cutting face 200*g* represented in Fig. 15 is expanded in width, then that figure may represent a relatively wide faced hand "stone" or lapping slab. It will be observed that when a blade such as shown in Figure 15 is reciprocated, its cutting stroke will be by movement toward the right as viewed in Figure 15. As is the case with the disk embodiment of the invention, the mouth of the notches 23*g* face in that direction.

Fig. 16 shows diagrammatically a typical rolling and swaging operation as applied to such a straight article. The pressure roller 38*g* has the same action as previously described; the action of pressing down the cutting face 200*g*, pressing ridges 220*g* and 230*g* over if they are used, pressing the overhanging wall 23*g* over onto the simultaneously compressed filling. The blade 20*g* is passed lengthwise between two lateral rolls and under roll 38*g*, the two lateral rolls may be of such forms as shown in Fig. 16 with body portions 385 which pass the body portion of blade 20*g* between them, and upper portions 386 of somewhat smaller diameters which pass the notched portions of the blade between them, and roll down the lateral ridges, or limit the lateral swaging expansion of the blade which is caused by swaging compression effected by roll 38*g*. Heating may be done in any of the manners before described, and may be done by passing current between the two roll portions 386, those portions being insulated from the bodies of the rolls as indicated by the insulation shown at 387.

Figure 17:
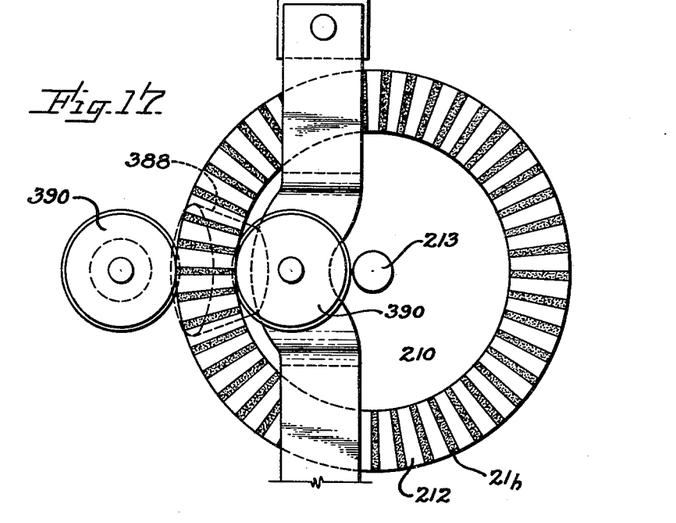
Figs. 17 and 18 are respectively, diagrammatic plan and vertical section illustrating the application of the heating and pressing operations to an abrasive body in the form of a cup wheel having a flat annular grinding face.
Figures 18, 19:
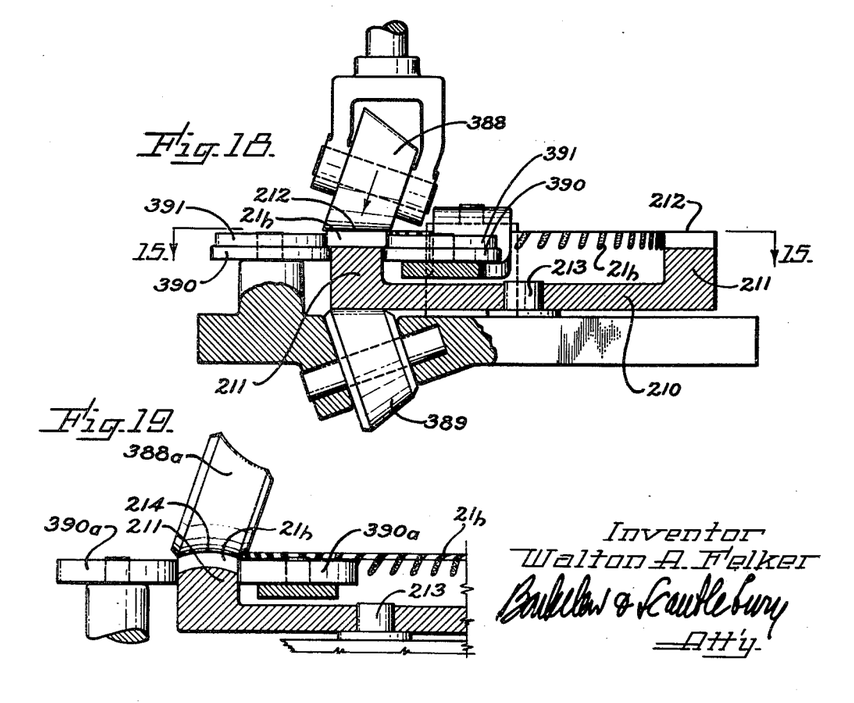
Fig. 19 is a fragmentary view similar to Fig. 18, illustrating the application of the operation to a lens generator or similar abrasive wheel.

Figs. 17 and 18 illustrate the application of my methods to a typical cup wheel. Such a cup wheel will ordinarily have a disk shaped body or backing 210 and an annular cylindric rim 211 with an annular flat cutting or grinding face 212. That annular face may again be regarded as an elongate cutting face across which the notches 21*h* extend, and below or into which the notches extend in depth at an acute angle to the length of the face 212. The length of the face here is in a circumferential direction, the width in a radial direction. The notches may be of any of the formations hereinbefore described, with or without edge ridges.

After the notches are filled with the abrasive fillings, the wheel may be operated upon by such an apparatus as is shown diagrammatically in Figs. 17 and 18. The wheel is shown as mounted on a central pin 213 so that it can be rotated under the face pressure roller 388 which performs the rolling and swaging operations on the cutting face of the wheel. The operational results are the same as before described, the cutting surface being rolled down and the overhanging notch walls being pressed over against the fillings while the fillings are compressed and incorporated. Another roll 389 is shown to support the wheel against pressure exerted by roll 388. To laterally confine the notched portion of the wheel body two opposing rolls 390 are shown. These may be either plain-faced rolls spaced apart by a dimension equal to the radial width dimension of annular cutting face 212; or may have reduced portions 391 opposite the notches 21*h*, either to roll down the ridges around those notches, or to limit the lateral swaging expansion of the notched portion and roll the expanded side surfaces down.

The cutting face 212 may again be regarded as an elongate cutting face whose length extends in a circumferential direction and whose width is in a radial direction. The cutting face itself is flat. Somewhat similar wheels, but with the annular cutting face 214 curved as shown in Fig. 19 are used for various purposes, such as for lens generation. Fig. 19 is a fragmentary showing similar to portions of Fig. 18, and showing that it is only necessary to use a pressure roller 388*a* with a peripheral shape conforming to curved face 214. Other than that, the essentials of the apparatus of Fig. 19 and of the operations performed thereby, are the same as in Figs. 17 and 18. Plain faced lateral rolls 390*a* are shown in Fig. 19.

If the radial width dimension of a cutting face 212 or 214 be reduced so that the cutting face is quite narrow, and annular body 211 quite thin, such a cup-shaped wheel then has a relatively narrow elongate cutting face, and may then be used for cutting or sawing circular disks out of blanks of material.

In any of the structures which have been described, the orientation of the notches with relation to the elongate cutting face is completely defined by saying that the notch extends transversely across the face, and extends in depth into the body at an acute angle to the face at the notch; the direction of the face at the notch being, in a peripheral cutter, the same as the direction of a tangent at that point. Or the angular orientation of the notch may be defined by saying that its center plane makes a sufficient angle with a normal to the elongate cutting face at the notch mouth that both notch walls slant in the same direction and the rear overhanging wall overhangs the other wall.

Cutters produced in accordance with the foregoing make-up and procedures have been found to have very free running and free cutting qualities and high cutting rates. Moreover, at high cutting rates, they have been found to produce very smooth and true cut surfaces. They also have comparatively long life, as they have very little tendency to drop the abrasive grains and particles until the grains and particles are usually very well worn. And it is another feature of the cutter that its cutting face remains flat instead of wearing away to a rounded edge.

I claim:

1. An abrasive article of the type described, comprising a metal body having an elongate cutting face and opposite side surfaces, the cutting face of said body being provided with longitudinally spaced open-ended notches extending transversely across said face, the notches being relatively deep and narrow and both walls thereof slanting in the same direction longitudinally of the elongate face at acute angles to a normal to the cutting face at the mouths of the notches so that one wall of each notch overhangs the other wall in said direction and the notches face in said direction, said direction being the direction of movement of the article on a cutting movement, longitudinally spaced and substantially duplicate embossments projecting outwardly from each side surface of the cutting face, each of the several embossments individually outlining one open end of one notch and forming portions of the notch walls which extend beyond the side surface of the body, the outer faces of the several embossments on each side surface lying in a single plane parallel to the side surface and each embossment outlining its respective notch end with a raised outlining surface of substantially uniform width around the periphery of the open notch end, a metallic insert having abrasive grain embedded therein and distributed throughout secured in each of the notches, incorporated with the metal body and completely filling the notches including those portions defined by the embossments, the lateral end faces of the inserts lying in the face planes of the embossments, the metallic inserts being held in the notches under compression by the body, the longitudinally spaced notch outlining embossments on each of the side surfaces being mutually longitudinally separated by recesses whose inner walls lie substantially in the planes of the side surfaces of the body.

2. An abrasive article of the type described, comprising a metal disk having a peripheral cutting face and opposite side surfaces, the peripheral face of said disk being provided with peripherally spaced open-ended notches extending transversely across said face, the notches being relatively deep and narrow and both walls thereof slanting in the same direction longitudinally of the peripheral face at acute angles to a radius to the cutting face at the mouths of the notches so that one wall of each notch overhangs the other wall in said direction and the notches face in said direction, said direction being the direction of rotation of the disk on a cutting movement, peripherally spaced and substantially duplicate embossments projecting outwardly from each side surface of the disk, each of the several embossments individually outlining one open end of one notch and forming portions of the notch walls which extend beyond the side surface of the disk, the outer faces of the several embossments on each side surface lying in a single plane parallel to the side surface and each embossment outlining its respective notch end with a raised outlining surface of substantially uniform width around the periphery of the open notch end, a metallic insert having abrasive grain embedded therein and distributed throughout secured in each of the notches, incorporated with the metal disk and completely filling the notches including those portions defined by the embossments, the lateral end faces of the inserts lying in the face planes of the embossments, the metallic inserts being held in the notches under compression by the body, the peripherally spaced notch outlining embossments on each of the side surfaces being mutually peripherally separated by recesses whose inner walls lie substantially in the planes of the side surfaces of the disk.

3. The method of forming an abrasive article comprising first notching an elongate cutting face of a body by swaging the body along lines at acute angles to that face at the several notches to displace body material immediately adjacent the mouth edges and the lateral edges of the notches formed thereby, and thus first forming a series of longitudinally spaced notches which extend transversely across the cutting face and are open laterally at the sides of the body where their edges are surrounded and defined by ridges of the displaced body material, said notches being relatively deep and narrow and extending in depth into the body in such direction that the center plane of each notch extends at a sufficient angle to a line normal to the elongate face at the mouth of the notch to cause both walls of the notch to slant in the same direction with respect to said line and so that one wall will overhang the other wall in a direction longitudinally of the elongate face, then filling each of the several formed notches with an abrasive filling, and then, while at least a localized portion of the notched and filled part of the body is laterally confined by pressural application of confining surfaces to the notch defining ridges, and while simultaneously heating at least said localized portion, applying localized pressure to the elongate cutting face of the localized portion and to the fillings along a line substantially normal to that face and progressively along the length of that face and in such direction that at least the portion of each overhanging notch wall adjacent the elongate face will be moved closed to the opposite notch wall to compress the filling and incorporate the filling into the body material, the localized, confined and heated portion of the body will be put under compression, and the displaced body material at both the mouth and lateral edges of the notches will be simultaneously ironed and pressed over the fillings.

4. The method defined in claim 3 and in which the lateral pressural confinement of the notched and filled part of the body is performed by progressively applying localized opposed lateral pressures to the notched portion of the body to which the facial pressure is being applied, whereby the displaced material at the lateral edges of the notches is ironed over the fillings.

5. The method of forming an abrasive article comprising first notching an elongate cutting face of a body by swaging the body along lines at acute angles to that face at the several notches to displace body material immediately adjacent the mouth edges and the lateral edges of the notches formed thereby, and thus first forming a series of longitudinally spaced notches which extend transversely across the cutting face and are open laterally at the sides of the body where their edges are surrounded and defined by ridges of the displaced body material, said notches being relatively deep and narrow and extending in depth into the body in such direction that the center plane of each notch extends at a sufficient angle to a line normal to the elongate face at the mouth of the notch to cause both walls of the notch to slant in the same direction with respect to said line and so that one wall will overhang the other wall in a direction longitudinally of the elongate face, then filling each of the several formed notches with a metallic abrasive-carrying matrix which matrix is capable of being compacted and of being incorporated with the metal body by application of heat and pressure, and then, while at least a localized portion of the notched and filled part of the body is laterally confined by pressural application of confining surfaces to the notch defining ridges, and while simultaneously heating at least said localized portion, applying localized pressure to the elongate cutting face of the localized portion and to the fillings along a line substantially normal to that face and progressively along the length of that face and in such a direction that at least the portion of each overhanging notch wall adjacent the elongate face will be moved closer to the opposite notch wall to compact the filling and incorporate the filling into the body material, the localized portion of the body will be put under compression, and the displaced body material at both the notch mouths and at the lateral edges of the notches will be simultaneously ironed and pressed over the fillings.

6. The method defined in claim 5 and in which the lateral pressural confinement of the notched and filled part of the body is performed by progressively applying localized opposed lateral pressures to the notched portion of the body to which the facial pressure is being applied, whereby the displaced material at the lateral edges of the notches is ironed over the fillings.

WALTON A. FELKER.

REFERENCES CITED

The following references are of record in the file of this patent:

UNITED STATES PATENTS

| Number | Name | Date |
|---|---|---|
| 486,084 | Clausnitzer | Nov. 15, 1892 |
| 531,051 | Marquart | Dec. 18, 1894 |
| 1,022,692 | Meyers | Apr. 9, 1912 |
| 1,063,380 | Peirce | June 3, 1913 |
| 1,099,984 | Kirsten | June 16, 1914 |
| 1,178,687 | Strickland | Apr. 11, 1916 |
| 1,488,912 | Foerster | Apr. 1, 1924 |
| 1,572,349 | Chamberlin | Feb. 9, 1926 |
| 1,712,034 | Fromm | May 7, 1929 |
| 1,887,373 | Emmons et al. | Nov. 8, 1932 |
| 1,895,926 | Hoyt | Jan. 31, 1933 |
| 1,939,991 | Krusell | Dec. 19, 1933 |
| 2,020,117 | Johnston | Nov. 5, 1935 |
| 2,068,848 | De Bats | Jan. 26, 1937 |
| 2,145,888 | Moulton et al. | Feb. 7, 1939 |
| 2,194,546 | Goddu et al. | Mar. 26, 1940 |
| 2,200,281 | Koebel | May 14, 1940 |
| 2,277,696 | Goddu | Mar. 31, 1942 |